No. 805,157. PATENTED NOV. 21, 1905.
J. P. RUNKEL.
GRATER AND SLICER.
APPLICATION FILED AUG. 12, 1904.
2 SHEETS—SHEET 1.
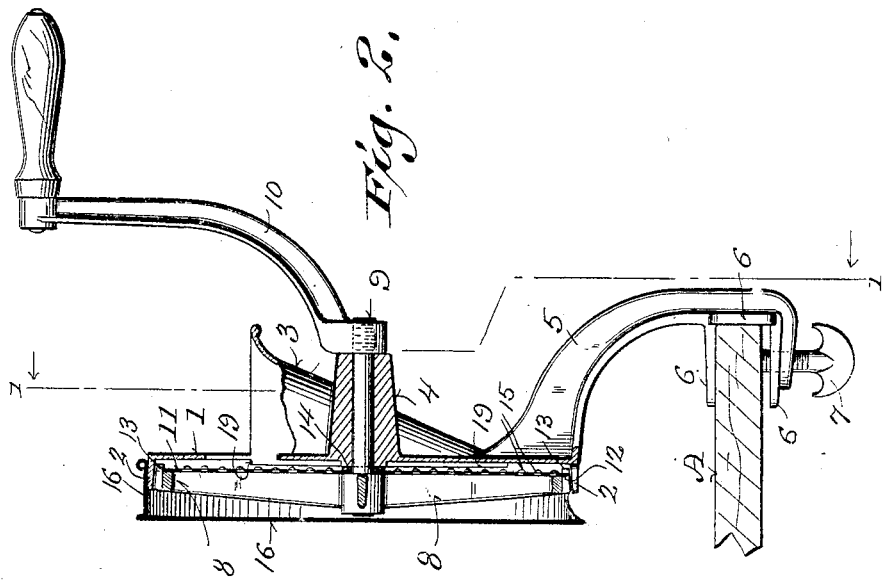
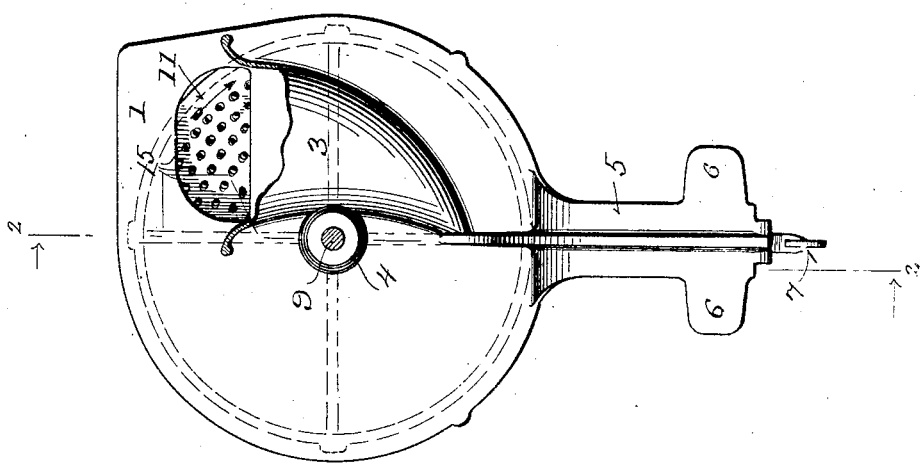
Witnesses:
Geo. W. Young.
Alma A. Klug.
Inventor:
John P. Runkel
By Benedict & Morsell
Attorneys.

No. 805,157. PATENTED NOV. 21, 1905.
J. P. RUNKEL.
GRATER AND SLICER.
APPLICATION FILED AUG. 12, 1904.
2 SHEETS—SHEET 2.
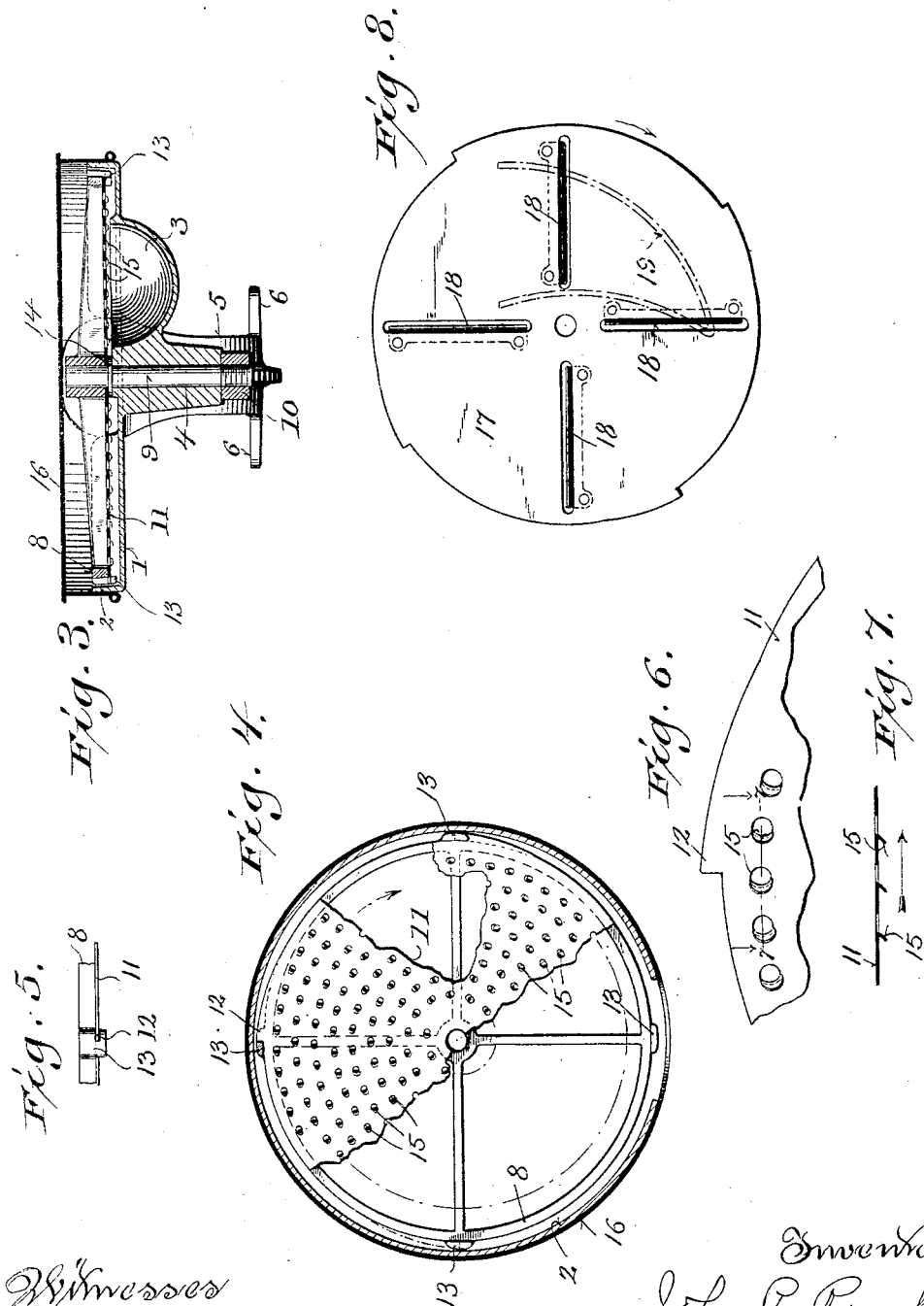
Witnesses
Geo. W. Young
Alma A. Klug
Inventor:
John P. Runkel
By Benedict & Morsell
Attorneys

UNITED STATES PATENT OFFICE.

JOHN P. RUNKEL, OF MILWAUKEE, WISCONSIN.

GRATER AND SLICER.

No. 805,157.      Specification of Letters Patent.      Patented Nov. 21, 1905.

Application filed August 12, 1904. Serial No. 220,508.

*To all whom it may concern:*

Be it known that I, JOHN P. RUNKEL, residing in Milwaukee, in the county of Milwaukee and State of Wisconsin, have invented new and useful Improvements in Graters and Slicers, of which the following is a description, reference being had to the accompanying drawings, which are a part of this specification.

My invention relates to an improved portable grater and slicer adapted for use more especially in kitchens.

The object of the invention is to provide a simple, compact, and non-expensive implement adapted to be taken apart readily for cleaning and which, being strong and durable in character, is by reason of its peculiar and specific structure better adapted than those heretofore in use for slicing, grating, and separating material.

The invention consists of the implement, its parts, and combinations of parts, as herein described and claimed, or the equivalents thereof.

In the drawings, Figure 1 shows a front elevation of the improved implement, a part being broken away to exhibit interior construction, and the handle being omitted. The view is on line 1 1 of Fig. 2. Fig. 2 is a section of the implement on line 2 2 of Fig. 1. Fig. 3 is a transverse horizontal section centrally of the main portion of the implement, the rear cover being indicated in outline. Fig. 4 is a front view of the grater-disk, parts being broken away to exhibit the spider-wheel, to which the grater is secured, the rim of the front case being shown in section. Fig. 5 is a detail of the means of securing the grater-disk detachably on its spider-wheel. Fig. 6 shows a fragment of the grater-disk, illustrating especially the construction of the grater-teeth. Fig. 7 is a section on line 7 7 of Fig. 6, and Fig. 8 shows a form of disk having slicing knives or cutters adapted to be employed interchangeably in the implement in the place of the grater-disk.

In the drawings, 1 represents the case, advisably constructed of metal and being generally of circular form and having a laterally-projecting flange-rim 2. The case is also provided with an aperture for feeding the material through it to the grater, which aperture is inclosed by a bell-shaped hopper 3, formed on and advisably integral with the case. The mouth of the hopper is open upwardly, and its discharging-throat opens through the case laterally and downwardly. A boss 4 on the case centrally is also advisably integral therewith and forms a bearing for the arbor of the spider-wheel and its handle. A downwardly and laterally projecting leg 5, rigid on the case, is provided with bearing-lips 6 6 6, which, with a thumb-screw 7, form a clamp by means of which the implement can be secured detachably to the top A of a table.

A spider or open wheel 8 is provided with an arbor 9, which has its bearing in the boss 4 on the case 1 and is provided with a handle 10, advisably screw-threaded on the arbor, whereby the handle can be detached, and the arbor can then be withdrawn from the boss. The grater-disk 11, advisably formed of sheet metal, is provided with a central aperture adapted to receive through it the arbor 9, and the disk rests against the legs or spokes and the rim of the spider-wheel, being secured in place thereon by projections 12 on the disk, which projections enter lateral recesses therefor in catches 13 on and projecting forwardly from the rim of the spider-wheel. The spider-wheel, with the disk thereon, is of such size as to fit loosely within the rim 2 of the case 1, and the disk, being opposite the inner surface of the case, is held at a proper distance therefrom conveniently by means of a washer or spacer 14 on the arbor 9 between the disk and the case.

The teeth 15 on the disk 11 project laterally therefrom and are arranged on the disk in a spiral line around and at ever-increasing distance from the center or axis of the disk, so that no two of the teeth are at exactly the same distance from the axis of the disk. These teeth are advisably constructed by cutting or punching tongues from the material of the disk, the principal portion of the tongue that is cut of and from the material of the disk being in substantially semicircular form and being turned outwardly and over rearwardly, so that the teeth when in use incline rearwardly outwardly, thus presenting toward the front an outer surface inclined rearwardly. Advisably there is a rib 19 formed on the inner surface of the circular portion of the case 1 along and at the bottom and side edges of the hopper-aperture, which rib projects from the case toward the disk. The rib in its entirety is of curved V shape, as indicated in Fig. 8, so that material being fed into the hopper and against the disk passes downwardly into the downwardly-directed apex of the hopper-throat and the bordering rib 19. This rib consequently becomes an opposing surface against which on its edge the material is held or over which it passes as it is being dismembered by the teeth or knives of the disk.

A detachable rear cover 16 is employed, the rim of which fits tightly but removably on the rim 2 of the case. This cover is in circular form and may be made of tin or other sheet metal. Both the cover 16 and the rim 2 are recessed in the lower part, forming a passage for the discharge of the grated or sliced material therethrough downwardly by gravity. The recesses or openings in the rim of the cover and in the rim of the case are clearly shown in Fig. 4. It will be noted that the form of the case and its supporting-leg 5 is such that the implement discharges the material that has been grated or sliced downwardly directly above and upon the table, upon which a receptacle may be placed for receiving the material.

In Fig. 8 a disk 17 is shown, which instead of teeth like the teeth 15 of the other drawings is provided with a series of slicing-knives 18, disposed radially in the disk, which disk 17 may be placed in the implement instead of a grating-disk 11, and when so changed the implement can be used for slicing vegetables or other material.

It will be understood that the implement is used by feeding material into the hopper 3 and that thereupon by rotating the disk by means of the handle 10 the material will be grated or sliced suitably and will be discharged from the implement downwardly toward the table.

What I claim as my invention is—

1. In a kitchen implement, a front case, a disk mounted and rotatable in the case, teeth cut from and on the disk projecting outwardly and turned and inclined rearwardly away from their openings in the disk, and means for rotating the disk.

2. In a kitchen implement, a front case, a disk formed of sheet metal mounted and rotatable in the case, teeth in substantially semi-circular form cut from the disk and turned outwardly and rearwardly away from their openings in the disk and presenting toward the case wide flat and rearwardly-inclined surfaces and means for rotating the disk.

3. In a kitchen implement, a circular case-front, a hopper on the case-front discharging inwardly and downwardly through the case-front, a rib on the inner surface of the front about the opening or throat of the hopper, a material-separating disk in the case, an arbor mounted rotatively in the case-front carrying the disk thereon, material-separating means on the disk arranged to pass close to said rib on the case-front when the disk is rotated, and a detachable rear cover fitting on and over the edge of the front case and over and behind the material-separating disk and its arbor, the case and the cover being provided at their lower edges with discharging recesses or apertures.

In testimony whereof I affix my signature in presence of two witnesses.

JOHN P. RUNKEL.

Witnesses:
   C. T. BENEDICT,
   ALMA A. KLUG.